United States Patent
Backman et al.

(10) Patent No.: US 9,946,317 B2
(45) Date of Patent: Apr. 17, 2018

(54) BI-DIRECTIONAL POWER TRANSFER

(71) Applicant: Microsoft Technology Licensing, LLC, Redmond, WA (US)

(72) Inventors: Juha Backman, Espoo (FI); Marko Yliaho, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 14/839,255

(22) Filed: Aug. 28, 2015

(65) Prior Publication Data
US 2017/0060207 A1    Mar. 2, 2017

(51) Int. Cl.
| | |
|---|---|
| G06F 1/26 | (2006.01) |
| G06F 3/0488 | (2013.01) |
| G06F 3/0484 | (2013.01) |
| G06F 3/01 | (2006.01) |
| G06F 3/0346 | (2013.01) |
| G06F 1/32 | (2006.01) |

(52) U.S. Cl.
CPC ............ *G06F 1/266* (2013.01); *G06F 1/3218* (2013.01); *G06F 1/3287* (2013.01); *G06F 3/017* (2013.01); *G06F 3/0346* (2013.01); *G06F 3/04847* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 6,732,218 B2 | 5/2004 | Overtoom et al. | |
| 7,094,086 B2 | 8/2006 | Teicher | |
| 7,537,471 B2 | 5/2009 | Teicher | |
| 8,035,368 B2 | 10/2011 | May | |
| 8,212,518 B2 | 7/2012 | Pijnenburg et al. | |
| 8,407,493 B2 | 3/2013 | Chung et al. | |
| 8,517,751 B1 | 8/2013 | Golko et al. | |
| 8,762,605 B2 | 6/2014 | Terlizzi et al. | |
| 8,898,485 B2 | 11/2014 | Scott et al. | |
| 2007/0035276 A1 | 2/2007 | Webjorn | |
| 2007/0236975 A1* | 10/2007 | Lippojoki ............. | H02J 7/0054 363/66 |
| 2009/0051648 A1* | 2/2009 | Shamaie ............... | G06F 3/0346 345/156 |

(Continued)

FOREIGN PATENT DOCUMENTS

CN          10320883 A       7/2013

OTHER PUBLICATIONS

"USB On-The-Go", Published on: Jan. 31, 2012, Availabe at: http://www.nxp.com/documents/leaflet/75016113.pdf.

(Continued)

*Primary Examiner* — Paul J Yen

(57) ABSTRACT

The user of a portable device defines the charging direction when two devices with bi-directional power transfers interfaces are interconnected. The device detects a gesture of the user and starts the power transfer to the defined direction. The user may also define the amount of charge to be transferred by the same gesture. The portable device may be operational for a longer period as long as there is another device sharing the battery charge. Embodiments of portable devices include smartphones, speakers, tablets, watches or other wearable devices.

20 Claims, 5 Drawing Sheets

(56) References Cited

U.S. PATENT DOCUMENTS

| | | | |
|---|---|---|---|
| 2011/0279393 A1* | 11/2011 | Okada | G06F 1/1626 345/173 |
| 2014/0183962 A1 | 7/2014 | Qian et al. | |
| 2014/0206209 A1 | 7/2014 | Kamei et al. | |
| 2014/0235095 A1 | 8/2014 | Jones et al. | |
| 2016/0062425 A1* | 3/2016 | Cudak | G06F 1/26 713/300 |
| 2016/0065546 A1* | 3/2016 | Krishna | G06F 17/2235 726/30 |

OTHER PUBLICATIONS

Hyde, John, "USB Multi-Role Device Design by Example", Published on: Oct. 10, 20101, Available at: http://www.usb-by-example.com/Multi-Role.pdf.

* cited by examiner

BI-DIRECTIONAL POWER TRANSFER

BACKGROUND

Many portable devices are battery powered. A user may carry several devices and sometimes the battery charge of one of the devices may drain. Some portable devices may be capable of receiving and transferring power through a bi-directional power transfer interface. One embodiment of such an interface is the USB Type-C. Bi-directional power transfer allows one device to donate battery charge to another device. Users having access to multiple portable devices thereby reduce the risk of a portable device running completely out of charge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user of a portable device may define a charging direction when two devices with bi-directional power transfer interfaces are interconnected. The device detects a gesture of the user and starts the power transfer to the defined direction. The user may also define the amount of charge to be transferred by the same gesture. The portable device may stay operational for a longer period as long as there is another device sharing the battery charge. Embodiments of portable devices include smartphones, speakers, tablets, watches or other wearable devices.

Many of the attendant features will be more readily appreciated as they become better understood by reference to the following detailed description considered in connection with the accompanying drawings. The embodiments described below are not limited to implementations which solve any or all of the disadvantages of bi-directional charging in hand-held devices.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an embodiment and not a limitation. As those skilled in the art will appreciate, the present embodiments are suitable for application in a variety of different types of portable, mobile and/or hand-held apparatuses, e.g. in tablets, laptops, smart watches, wearable devices, or gaming consoles having suitable sensors for detecting a user's gesture. A gesture is herein defined as a motion of an object or body part of the user, wherein the motion has a starting position and a final position. The gesture is not a simple action of pushing a button, touching a software/touch button or operating a switch that has two positions, on/off.

Figure 1:
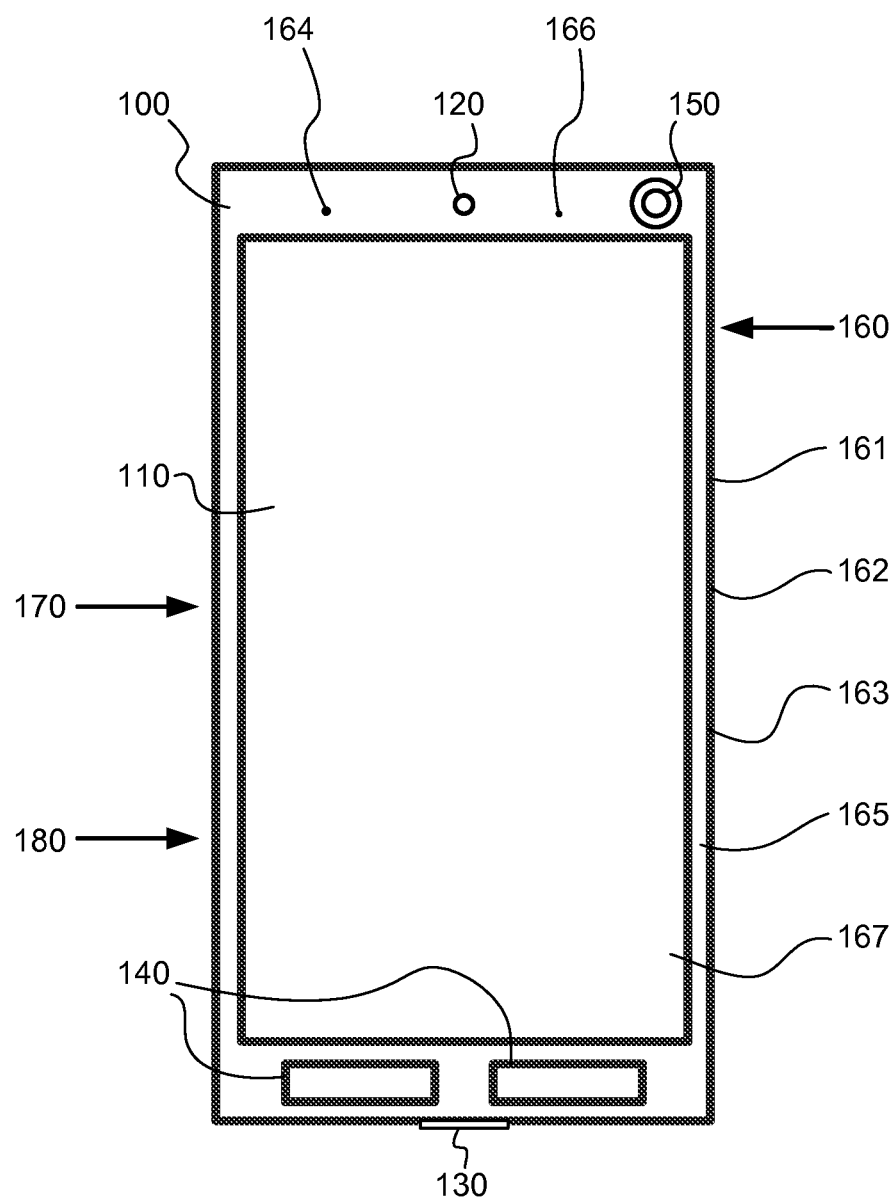
FIG. 1 illustrates a portable device according to an embodiment, wherein the portable device is a smartphone.

FIG. 1 illustrates a portable device according to an embodiment, wherein the portable device is a smartphone. The portable device comprises a body 100 comprising a display 110, a speaker 120, a microphone 130 and keys 140. The display 110 is usually on the front side of the portable device. The portable device comprises a camera 150. The portable device may comprise multiple input sensors 160 to detect the environment and to enable interaction with the user interface. Embodiments of input sensors 160 that may be implemented in the portable device are a gyroscope 161, an accelerometer 162, a magnetometer 163, a camera 150, a microphone 130, an ambient light sensor 164, a force sensor 165, a proximity sensor 166 and a touch sensor 167. A power source 170 is configured inside the body 100. The power source 170 stores electrical energy for the portable device. One embodiment of the power source 170 may be a battery suitable for a smartphone or a mobile phone. A gesture detecting element 180 is configured to receive or detect a user gesture through the input sensor 160. In an embodiment multiple and/or different types of input sensors 160 are used either simultaneously or in a predefined sequence to improve the accuracy, reliability or to enlarge the detection area. The gesture detecting element 180 may be implemented partially by the operating system of the portable device; it may be implemented by hardware or by partially hardware and partially embedded software. In an embodiment the software or a part of the software is configured in a cloud computing environment and at least a portion of the software is executed in the cloud computing environment. At least one sensor 160 may be included in the gesture detecting element 180 or the gesture detecting element 180 may be directly connected to the input sensor 160. The portable device comprises at least one processor and at least one memory including computer program code for one or more programs. The at least one memory and the computer program code are configured, with the at least one processor, to cause the apparatus to perform at least the functionality described herein. The system described hereinafter may comprise portion of the portable device, its components and/or peripherals connected to the portable device. For example, in an embodiment the portable device is a wearable device such as a watch that may be operable without physical keys. In another embodiment the battery may be detachable from the device or it may be an external, visible component.

Figure 2:
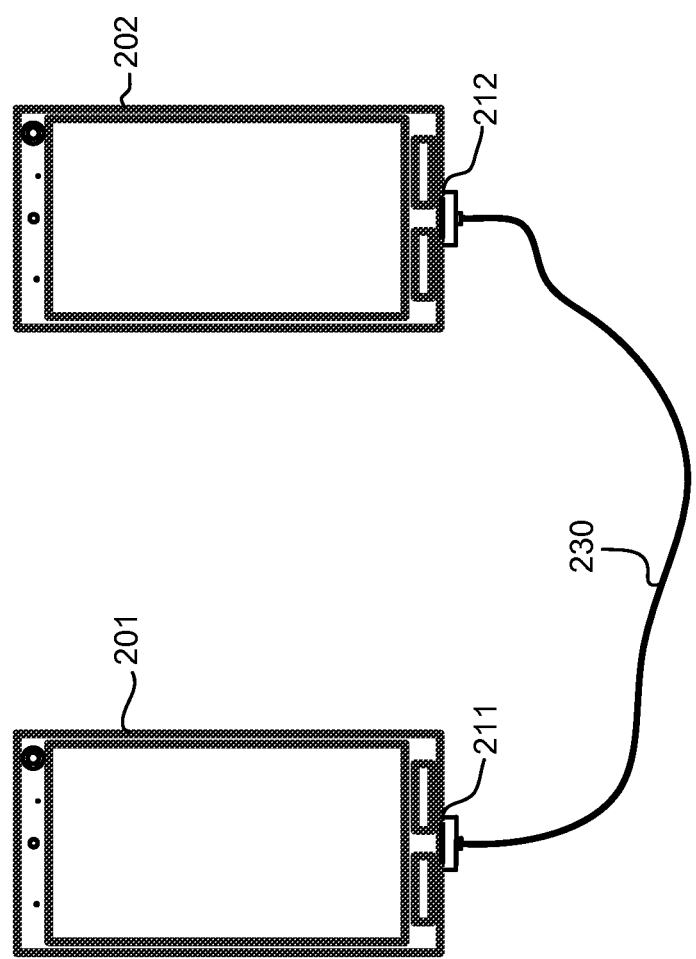
FIG. 2 shows one embodiment of a configuration with two portable devices.

FIG. 2 shows one embodiment of a configuration with two portable devices. A portable device 201 comprises a bi-directional power transfer interface 211. A second portable device 202 also comprises a bi-directional power transfer interface 212. A connecting cable 230 connects the portable device 201 and the second portable device 202 via the bi-directional power transfer interfaces 211, 212. According to an embodiment, the bi-directional power transfer interfaces 211, 212 and the connecting cable 230 may conform to USB Type-C specifications. The portable device 201 and the second portable device 202 each comprise a battery that is connected to the bi-directional power transfer interfaces 211, 212. The portable devices 201,202 may be configured to donate and/or receive battery charge through their respective bi-directional power transfer interfaces 211, 212. The battery charge may be transferred from the first portable device 201 to the second portable device 202 or from the second portable device 202 to the first portable device 201.

The gesture detecting element 180 of the portable device is configured to receive information when the connecting cable 230 is connected between the portable devices 201, 202 to the bi-directional power transfer interfaces 211, 212. A negotiation protocol may inform the portable device 201 of the power transfer capabilities of the second portable device 202. In one embodiment the operating system of the portable device 201 detects the connection of the connecting cable 230 between the portable device 201 and the second portable device 202. The operating system transmits the information of the connection to the gesture detecting element 180. After receiving the information the gesture detecting element may be set to the state, wherein the following user gesture may relate to the power transfer direction. In one embodiment, the negotiation protocol follows the USB Type-C specification. In one embodiment, as the power transfer interface 211 detects that the power source of the second portable device 212 is a battery, the gesture detecting element 180 is initiated to detect user gestures indicating the power transfer direction between devices 201, 202. In one embodiment, the gesture detecting element 180 may be configured to detect the initial position and/or the final position of the gesture relating to the power transfer direction. According to an embodiment, when the portable device 201 is connected to a second device 202 having mains current as a power source, the portable device 201 may start charging its battery without waiting for the user gesture indicating the power transfer direction. The negotiation protocol may inform the portable device 201 about the characteristics of the second device 202.

Figure 3A:
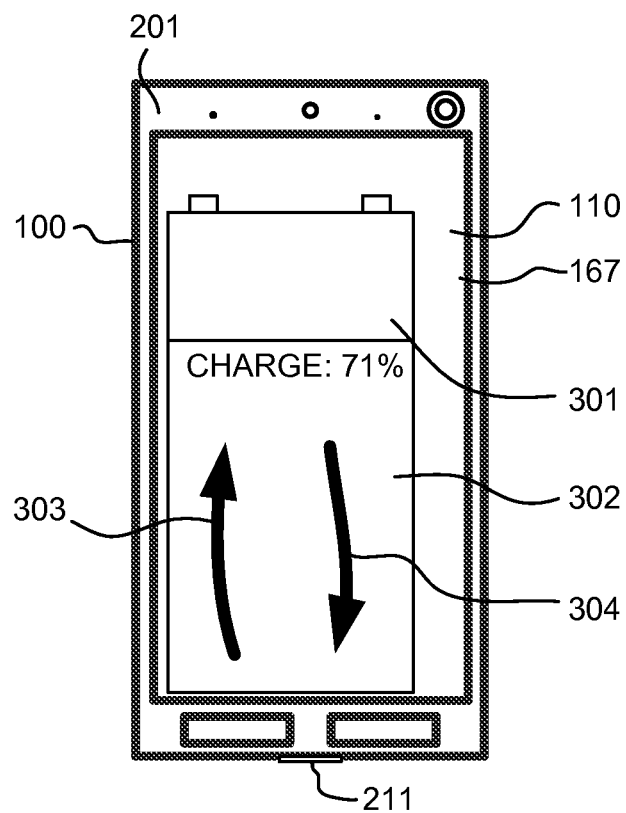
FIG. 3a illustrates one embodiment of a user gesture on a display.

One embodiment of a user gesture is illustrated in FIG. 3a. The display 110 of the portable device comprises a touch sensor 167. The user interface displays an image of a large battery 301 after detecting the connection of a connecting cable 230. In this embodiment the portable device has 71% battery charge 302 as an illustrative example. By swiping away from the power transfer interface 211 located, for example, at the bottom of the portable device along the arrow 303 the gesture detecting element 180 receives information through the touch sensor that the user desires that the battery of the portable device 201 be charged. By swiping towards the power transfer interface 211 along the arrow 304 the gesture detecting element 180 receives information that the user desires that the portable device donate power through the connecting cable 230. A swipe includes a movement along the surface of the display 110, wherein the swipe comprises an initial position and a final position on the display area 110. In one embodiment the swipe may comprise a unidirectional motion. The display 110 may visualize the swipe with a visual cue along which the user may drag the swipe. The visual cue may appear after detecting the initial position or it may be visible for a predetermined time after connecting the cable 230 to enable the user to identify the initial position. The visual cue may also indicate, in the battery image, the amount of power to be donated and/or the charge level that will remain in the portable device 201.

Figure 3B:
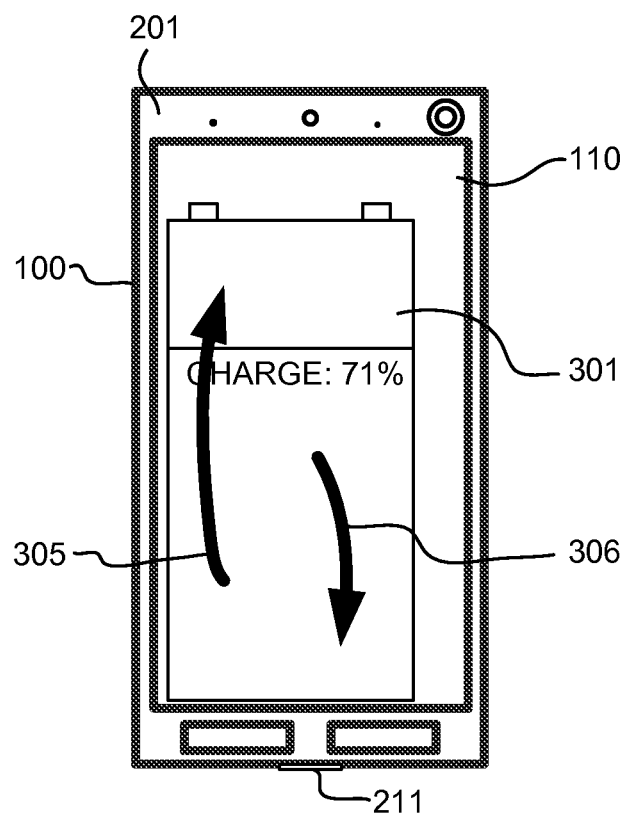
FIG. 3b illustrates one embodiment of a user gesture on a display.

FIG. 3b illustrates another embodiment of a user gesture, wherein one gesture indicates both the direction and the amount of charge to be transferred. The swipe 305 has a magnitude indicating the amount of charge to be transferred from the second portable device 202. The swipe 306 directed towards the power transfer interface 211 indicates that the user desires that the portable device 201 donate power to the second device 202, wherein the length of the swipe indicates the amount of charge. In an embodiment the end position of the swipe in the longitudinal direction of the portable device 201 defines the amount of charge to be transferred. Definition of the transferrable charge ensures that the portable device 201 retains an amount of charge after donating a portion of it to the second portable device, thus eliminating the chance of battery of the portable device 201 draining too much when donating the charge. According to an embodiment, the functionality according to embodiments illustrated in FIG. 3a or FIG. 3b. may be executed with the display 110 fully or partially turned off. Detecting the touch sensor and the swipe gesture after connecting the cable 230 to the power transfer interface 211 may start the power transfer. According to an embodiment, the selective regions of the display may turn on to show visual cues to the user or it may not turn on at all. The visual cue may indicate the level of remaining charge during the swipe, thus providing feedback to the user about the battery charge (e.g. 41%) after the portable device 201 has donated power to the second portable device 202. This may ensure, in cases where battery charge is low, that the battery charge is not consumed for powering the display 110. One example of a gesture which may be executed on the display 110 when it is off towards the power transfer interface and the connecting cable 230.

In an embodiment the amount of charge to be transferred is defined by the force detected from the user pressing the display 110. The display 110 comprises a force sensor configured to detect the pressure applied to the display 110. The amount of charge to be transferred may be proportional to the force, for example a stronger press results a larger amount of charge to be transferred. This embodiment may be combined with other embodiments, such as the display-oriented charge direction definition methods illustrated in FIG. 3a or FIG. 3b.

Figure 4A:
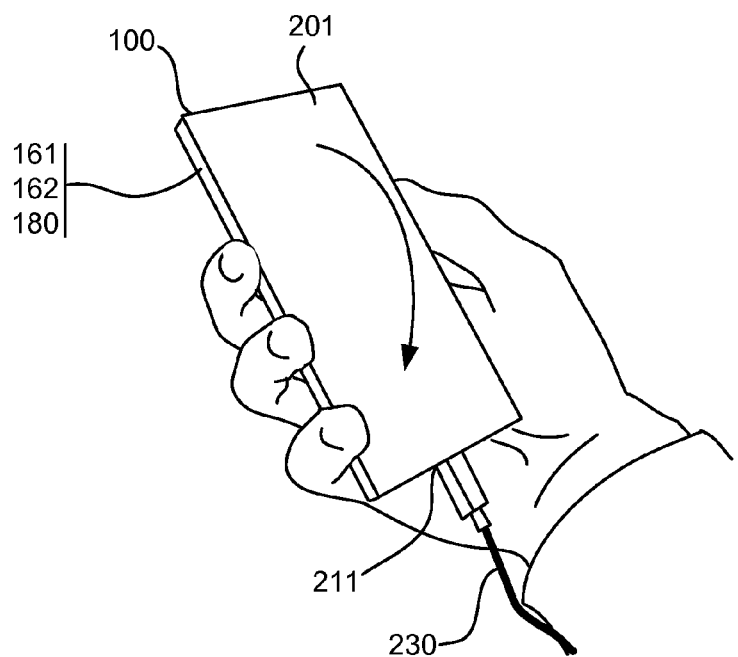
FIG. 4a illustrates one embodiment of a user gesture on a portable device.

FIG. 4a illustrates one embodiment of a user gesture for indicating the power transfer direction after detecting that cable 230 has been connected. The user holds the body 100 of the portable device 201 and tilts it towards the power transfer interface 211 and the connecting cable 230. An input sensor, for example an accelerometer 162 or/and a gyroscope 161 or/and a camera detects the tilt and sends the information to the gesture detecting element 180. If the gesture detecting element 180 detects the tilt to have occurred after connecting the cable 230, it informs the operating system to start transferring power to the second device 202. In an embodiment, the tilting gesture may resemble pouring the battery charge from the portable device. In an embodiment, the tilting and/or subsequent charging may be visualized on the display 110 as pouring the battery charge from the device 201. In one embodiment the tilting angle of the portable device 201 is measured with the accelerometer 162 or/and the gyroscope 161. The tilting angle corresponds to the amount of power donated to the second portable device 202. The display may show a visual cue to the user to indicate the relation between the tilting angle and the power to be donated to the second portable device 202, for example more tilt causes the visual cue to indicate more power to be donated to the second portable device 202. In an embodiment the second portable device 202 is configured to display an indication of the power sharing, for example starting the charging or indication of the charge to be received during the connection to the portable device 201. In an embodiment the amount of charge to be transferred is defined by the amount of shaking detected from the user shaking the portable device 201. The accelerometer detects the shaking and increases the indication of charge to be transferred when detecting more shaking.

Figure 4B:
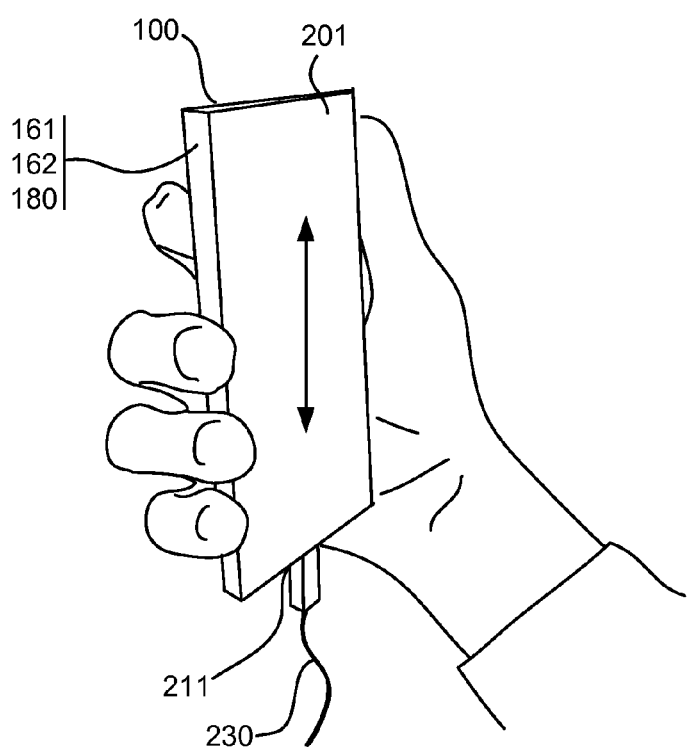
FIG. 4b illustrates one embodiment of a user gesture on a portable device.

FIG. 4b illustrates one embodiment of a user gesture for indicating the power transfer direction. The user holds the body 100 of the portable device in an upright position and shakes the portable device. The accelerometer 162 or/and the gyroscope 161 detects the shaking action and sends the information to the gesture detecting element 180. If the gesture detecting element 180 detects the shaking action to have occurred after connecting the cable 230, it informs the operating system to start transferring power to the second device 202. In an embodiment, the shaking gesture may resemble shaking the "power particles" out of the portable device to the connecting cable 230. In an embodiment, the shaking and/or subsequent charging may be visualized on the display 110 as shaking the "power particles" out from the device 201 to the connecting cable 230.

Figure 5A:
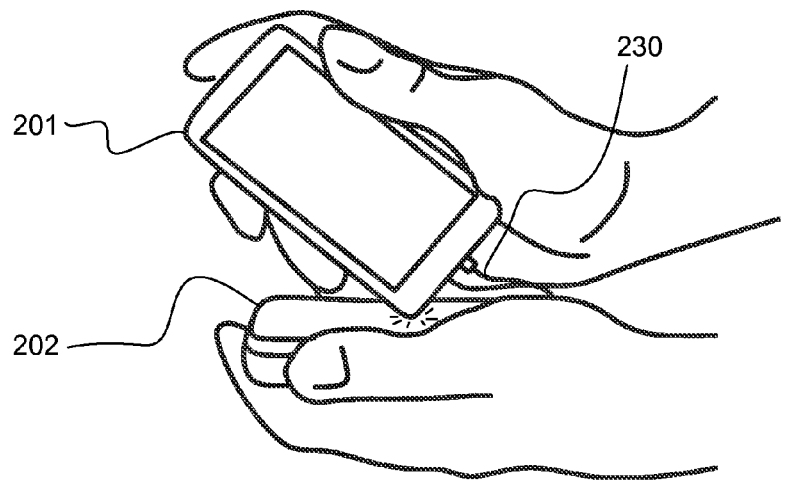
FIG. 5a illustrates one embodiment of a user gesture with two portable devices.

FIG. 5a illustrates one embodiment of a user gesture for indicating the power transfer direction, wherein the portable device 201 is taken near the second portable device 202 until it touches the second portable device 202 or the portable device 201 detects that the second portable device 202 is within a predetermined distance from the portable device 201. The two portable devices 201, 202 may be moved to touch or tap each other's displays when they are connected by the connecting cable 230. The power transfer direction may be set by the sequence of taps, for example power transfer is set from the device that is tapped first to the device that is tapped after. In an embodiment the portable device 201 touches the second portable device 202, wherein the accelerometers 162 in the portable device 201 and in the second portable device 202 are used to decide the charging direction. For example, when the portable device 201 actively touches the second portable device 202, the charge is transferred from the portable device 201 to the second portable device 202. The data received from the accelerometer 162 is different in both devices, because the portable device 201 accelerates slowly and decelerates fast during the touch and the second portable device 202 accelerates fast during the touch and then decelerates slower.

Figure 5B:
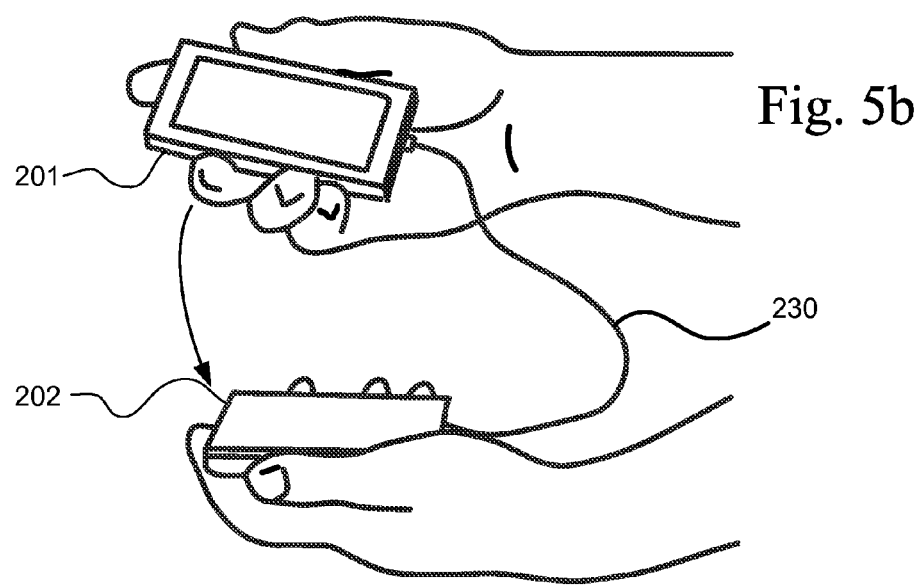
FIG. 5b illustrates one embodiment of a user gesture with two portable devices.

FIG. 5b illustrates one embodiment of a user gesture for indicating the power transfer direction, wherein the vertical distance between the portable devices 201, 202, may define the direction of power transfer. If the portable device 201 is positioned higher than the second portable 202 device and it is shook or tilted after connecting the cable, the power is transferred from the portable device 201 to the second portable device 202. The suggested user experience is that the battery charge pours from above to the lower device; it may be visualized on the display 110 as well. Additionally, either device or both devices may acknowledge starting the power transfer to the user by visual signal, a sound or by vibrating the device. In an embodiment the portable device 201 and the second portable device 202 comprise a barometer configured to detect the difference in elevation between devices when held by a person. The barometer may detect the absolute air pressure or changes in the air pressure. Detecting changes in the air pressure allows the device to detect if it is moving upwards or downwards. In an embodiment the change in elevation may be detected using an accelerometer, a camera or a gyroscope.

In one embodiment the camera 150 acts as the sensor detecting the user gesture. The camera detects the direction of eyes of the user, wherein the eye movement indicates the power transfer direction. For example, the user may stare at the cable and shift the view to another device.

In one embodiment the charging direction is set by a voice command, wherein the portable device comprises a microphone 130 to capture the voice command. Examples of a voice command are "charge Device A using Device B" or "charge C's phone using D's tablet computer".

In one embodiment the charging direction is set by gestures detected near the body 100 of the device, for example above the display 110. The user-related gesture is detected with a camera 150, a proximity sensor 166 or a system comprising a sound-wave emitter, such as an ultrasound emitter and a microphone receiver. In one embodiment the user-related gesture is a unidirectional movement of an object such as a hand, a finger, multiple fingers, eyes or a stylus. The movement may be along a surface or a path in the vicinity of the portable device. The portable device may detect gestures on the air. In one embodiment the input sensor is configured to detect the starting position of the object in the unidirectional movement and the final position of the unidirectional movement. The portable device may be initiated to detect the starting position when the connecting cable is connected between two portable devices and the portable device has completed the negotiation with the second portable device about the possibility to bi-directional power transfer. Negotiation may be needed due to ambiguity in charging capability of each device. As an example, the portable device 201 may be resting on a docking station that has no connection to the mains current. The power transfer direction is not obvious as the portable device may be connected to another portable device, such as a speaker or a smartwatch.

In one embodiment the portable device 201 is wirelessly connected to a docking station or a device configured for wireless charging, for example conforming to Qi standard. The docking station or the device configured for wireless charging may participate in the power transfer negotiation between the portable device 201 and the second portable device 202, wherein the second portable device 202 may be connected to the docking station with a connecting cable 230. In this embodiment the docking station may receive charge from the second portable device through the connecting cable 230 and transfer it to the portable device wirelessly. In one embodiment the system comprises a docking station.

The bi-directional power transfer interface 211, such as the USB Type-C may be configured to transmit data and power. After connecting the devices 201, the user may be prompted to choose the desired action, whether the device 201 should transfer data, synchronize the data or transfer power in the desired direction. The user gesture for enabling the power transfer to the desired direction may simplify the connection procedure.

One aspect discloses a portable device comprising: a first power source; at least one bi-directional power transfer interface configured to connect the device to a second device having a second power source; a gesture detecting element comprising an input sensor; wherein the gesture detecting element is configured to receive through the input sensor a user gesture; and the gesture detecting element is configured to define a power transfer direction through the bi-directional power transfer interface as a response to the user gesture. In an embodiment the gesture detecting element is configured to receive information of insertion of a power transfer cable connected between the bi-directional power transfer interface of the device and the second bi-directional power transfer interface of the second device. In an embodiment the input sensor is selected from the group of: gyroscope, accelerometer, magnetometer, camera, microphone, ambient light sensor, thermometer, force sensor and proximity sensor. In an embodiment the user-related gesture is a unidirectional movement of an object along a surface and the input sensor is configured to detect the starting position of the object in the unidirectional movement and the final position of the unidirectional movement. In an embodiment the device comprises a display configured to display a visual cue indicating the power transfer direction as a response to the detected starting position of the object. In an embodiment the gesture detecting element is configured to receive information of the amount of the charge to be transferred with the user-related gesture indicating the direction of power transfer. In an embodiment the device comprises a display configured to be turned off when detecting the user-related gesture on the surface of the display.

One aspect discloses a system comprising: a portable device; a first power source configured to provide power to the portable device; at least one bi-directional power transfer interface configured to connect the portable device to a second device having a second power source; a gesture detecting element comprising an input sensor; wherein the gesture detecting element is configured to receive through the input sensor a user-related gesture; and the gesture detecting element is configured to define a power transfer direction through the bi-directional power transfer interface as a response to the user-related gesture. In an embodiment the gesture detecting element is configured to receive information of insertion of a power transfer cable connected between the bi-directional power transfer interface of the device and the second bi-directional power transfer interface of the second device. In an embodiment the input sensor is selected from the group of: gyroscope, accelerometer, magnetometer, camera, microphone, ambient light sensor, thermometer, force sensor and proximity sensor. In an embodiment the user-related gesture is a unidirectional movement of an object along a surface and the input sensor is configured to detect the starting position of the object in the unidirectional movement and the final position of the unidirectional movement. In an embodiment the system comprises a display configured to display a visual cue indicating the power transfer direction as a response to the detected starting position of the object. In an embodiment the gesture detecting element is configured to receive information of the amount of the charge to be transferred with the user gesture indicating the direction of power transfer. In an embodiment the system comprises a display configured to be/remain turned off when detecting the user gesture on the surface of the display.

One aspect discloses a method, comprising: a portable device comprising a first power source and at least one bi-directional power transfer interface configured to connect the device to a second device having a second power source; a gesture detecting element detecting a user-related gesture; and the gesture detecting element defining a power transfer direction through the bi-directional power transfer interface as a response to the user-related gesture. In an embodiment the method comprises the gesture detecting element receiving information of insertion of a power transfer cable connected between the bi-directional power transfer interface of the device and the second bi-directional power transfer interface of the second device. In an embodiment the user-related gesture is a unidirectional movement of an object along a surface and the input sensor detecting the starting position of the object in the unidirectional movement and the final position of the unidirectional movement. In an embodiment the method comprises a display displaying a visual cue on the power transfer direction as a response to detecting the starting position of the object. In an embodiment, the method further comprises receiving information of the amount of the charge to be transferred with the user-related gesture indicating the direction of power transfer. In an embodiment, the method further comprises comprising detecting the user-related gesture on the surface of a display when the display is turned off.

An embodiment of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by a computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not embodiments of computer storage media. Although the computer storage media are shown within the computing-based device it will be appreciated that the storage may be distributed or located remotely and accessed via a network or other communication link, for embodiment by using communication interface.

The computing-based device may comprise an input/output controller arranged to output display information to a display device which may be separate from or integral to the computing-based device. The display information may provide a graphical user interface, for embodiment, to display hand gestures tracked by the device using the sensor input or for other display purposes. The input/output controller may also be arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Embodiments of tangible storage media include computer storage devices comprising computer-readable media such as disks, thumb drives, memory etc. and do not only include propagated signals. Propagated signals may be present in tangible storage media, but propagated signals per se are not embodiments of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an embodiment of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For embodiment, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A portable device comprising:
   a first power source;
   at least one bi-directional power transfer interface configured to connect the portable device to a second device having a second power source;
   a gesture detecting element comprising an input sensor;
   wherein the gesture detecting element is configured to receive, through the input sensor, a user gesture comprising a particular movement of the portable device, wherein the particular movement of the portable device comprises shaking or tilting the portable device after the portable device is raised a vertical distance away from the second device; and
   the gesture detecting element is configured to define a power transfer direction through the bi-directional power transfer interface as a response to the particular movement of the portable device.

2. A portable device according to claim 1, wherein the gesture detecting element is configured to receive information of insertion of a power transfer cable connected between the bi-directional power transfer interface of the portable device and the second bi-directional power transfer interface of the second device.

3. A portable device according to claim 1, wherein the input sensor is selected from the group of: gyroscope, magnetometer, camera, microphone, ambient light sensor, thermometer, force sensor and proximity sensor.

4. A portable device according to claim 1, wherein the particular movement of the portable device further comprises tapping the portable device on the second device.

5. A portable device according to claim 4, comprising a display configured to display a visual cue on the power transfer direction as a response to the detected starting position of the portable device.

6. A portable device according to claim 1, wherein the particular movement of the portable device further comprises raising the portable device the vertical distance away from the second device.

7. A portable device according to claim 6, wherein the input sensor is an accelerometer.

8. A system comprising:
   a portable device;
   a first power source configured to provide power to the portable device;
   at least one bi-directional power transfer interface configured to connect the portable device to a second device having a second power source;
   a gesture detecting element comprising an input sensor;
   wherein the gesture detecting element is configured to receive through the input sensor a user-related gesture comprising a particular movement of the portable device, wherein the particular movement of the portable device comprises shaking or tilting the portable device after the portable device is raised a vertical distance away from the second device; and
   the gesture detecting element is configured to define a power transfer direction through the bi-directional power transfer interface as a response to the particular movement of the portable device.

9. A system according to claim 8, wherein the gesture detecting element is configured to receive information of insertion of a power transfer cable connected between the bi-directional power transfer interface of the portable device and the second bi-directional power transfer interface of the second device.

10. A system according to claim 8, wherein the input sensor is selected from the group of: gyroscope, magnetometer, camera, microphone, ambient light sensor, thermometer, force sensor and proximity sensor.

11. A system according to claim 8, wherein the particular movement of the portable device further comprises tapping the portable device on the second device.

12. A system according to claim 11, comprising a display configured to display a visual cue on the power transfer direction as a response to the detected starting position of the portable device.

13. A system according to claim 8, wherein the particular movement of the portable device further comprises raising the portable device the vertical distance away from the second device.

14. A system according to claim 13, wherein the input sensor is an accelerometer.

15. A method, comprising:
   a portable device comprising a first power source and at least one bi-directional power transfer interface configured to connect the device to a second device having a second power source;
   a gesture detecting element detecting a user-related gesture comprising a particular movement of the portable device, wherein the particular movement of the portable device comprises shaking or tilting the portable device after the portable device is raised a vertical distance away from the second device; and
   the gesture detecting element defining a power transfer direction through the bi-directional power transfer interface as a response to the particular movement of the portable device.

16. A method according to claim 15, further comprising receiving information of insertion of a power transfer cable connected between the bi-directional power transfer interface of the portable device and the second bi-directional power transfer interface of the second device.

17. A method according to claim 15, wherein the particular movement of the portable device further comprises tapping the portable device on the second device.

18. A method according to claim 17, further comprising displaying a visual cue on the power transfer direction as a response to detecting the starting position of the portable device.

19. A method according to claim 15, further comprising receiving information of the amount of the charge to be transferred with the user-related gesture indicating the direction of power transfer.

20. A method according to claim 15, wherein the particular movement of the portable device comprises raising the portable device the vertical distance away from the second device.

* * * * *